United States Patent [19]
Gayton et al.

[11] Patent Number: 5,680,401
[45] Date of Patent: Oct. 21, 1997

[54] METHOD AND APPARATUS FOR ASYNCHRONOUSLY SEGMENTING PACKETS OF MULTIPLE CHANNELS INTO ATM CELLS

[75] Inventors: Andre Gayton, Union City; Rasoul M. Oskouy, Fremont, both of Calif.

[73] Assignee: Sun Microsystems, Inc., Mountain View, Calif.

[21] Appl. No.: 549,538

[22] Filed: Oct. 27, 1995

[51] Int. Cl.$^6$ .................. H04L 12/56; H04J 3/26
[52] U.S. Cl. ........................... 370/474; 370/355
[58] Field of Search .............. 370/60, 60.1, 94.1, 370/94.2, 110.1, 471, 473, 474, 476, 395, 355, 356, 399

[56] References Cited

U.S. PATENT DOCUMENTS

| | | |
|---|---|---|
| 5,136,584 | 8/1992 | Hedlund .................. 370/94.1 |
| 5,204,882 | 4/1993 | Chao et al. .................. 375/106 |
| 5,214,642 | 5/1993 | Kunimoto et al. .......... 370/82 |
| 5,274,768 | 12/1993 | Traw et al. .................. 395/275 |
| 5,327,421 | 7/1994 | Hiller et al. ................ 370/60.1 |
| 5,329,623 | 7/1994 | Smith et al. ................ 395/275 |
| 5,375,121 | 12/1994 | Nishino et al. ............. 370/94.2 |
| 5,379,297 | 1/1995 | Glover et al. .............. 370/60.1 |
| 5,414,707 | 5/1995 | Johnston et al. ............ 370/19 |

*Primary Examiner*—Hassan Kizou
*Assistant Examiner*—Kwang Bin Yao
*Attorney, Agent, or Firm*—Blakely Sokoloff Taylor & Zafman

[57] ABSTRACT

A network interface card (NIC) is provided with a transmit unload block for asynchronously segmenting packet data into ATM cells for packets of multiple channels. The transmit unload block comprises a cellification block and a cellification and DMA scheduler. The cellification block is used to perform the actual cellification of the packet data into ATM cells, one ATM cell at a time, and management of the packet control data associated with the ATM cell's packet as well as management of the buffer control data associated with the ATM cell's channel. The construction of the current ATM cell is overlapped with the management of the packet and buffer control data associated with the immediately preceding ATM cell. The cellification and DMA scheduler is used to control the operation of the cellification block. The cellification and DMA scheduler is also used to schedule DMAs to obtain additional packet data for the channels.

20 Claims, 7 Drawing Sheets

METHOD AND APPARATUS FOR ASYNCHRONOUSLY SEGMENTING PACKETS OF MULTIPLE CHANNELS INTO ATM CELLS

BACKGROUND OF THE INVENTION

1. Field of the Invention

The present invention relates to the field of computer networking. More specifically, the present invention relates to the segmentation of packets into asynchronous transfer mode (ATM) cells.

2. Background Information

Network interface card (NIC) for transmitting and receiving packets in cells for multiple channels asynchronously is known in the art. Typically, the NIC includes a segmentation engine for asynchronously segmenting the packets of the various channels into cells. The segmentation engine would employ some kind of prioritization scheme in selecting the channels for service. For example, channels requiring certain constant bit rates (CBR) to be sustained will be selected over channels that can tolerate variable bit rates (VBR). Upon selection of a channel for service, typically under the prior art, the segmentation engine will read the channel's control information, such as the channel's data rate, the header information, location of the packet data. Upon reading the control information, the segmentation engine would proceed to read the packet data (via direct memory accesses (DMA)), cellify some of the packet data into ATM cells, and forward the ATM cells onto certain media services on the NIC for transmission over the media. The segmentation engine would also update and save the control information, before moving on to service another channel. Additionally, to facilitate the segmentation process, local buffers are often employed to stage the packet data, typical one buffer per channel. If local buffers were employed, the segmentation engine is further responsible for managing these local buffers, i.e. where to write into and where to read from. Preferably, when the packet data in any of the local buffer gets "low", the segmentation engine would also schedule a DMA cycle for the channel to refill its local buffer. This process will be performed on a channel by channel basis, one channel after another (higher priority channels may get serviced more often than the lower priority channels).

Today, most NIC operates with a maximum bit rate of 155 Mbit/sec. At this maximum bit rate, the process for cellifying packet data into an ATM cell, and managing the changes to packet and buffer control data as well as the local buffer, may take as long as 2.7 microseconds. 4 microseconds are sufficiently long for the above described channel by channel approach. However, as technology continues to improve, applications are requiring higher and higher data rates. It is expected that NIC will have to support a data rate as high as 622 Mbps in the not too distant future. At 622 Mbps, the segmentation engine can take approximately only 0.7 microsecond to cellify packet data into an ATM cell and discharge all the other management responsibilities at the same time. 1 microsecond is too short to perform all the required tasks in the conventional channel by channel approach.

Thus, an improved approach for asynchronously segmenting packet data of multiple channels into ATM cells is desired. As will be described in more detail below, the present invention achieves these and other desirable results.

SUMMARY OF THE INVENTION

A NIC is provided with a transmit unload block for asynchronously segmenting packets of multiple channels into ATM cells. The transmit unload block comprises a cellification block (hereinafter simply Cell-block) and a cellification and DMA scheduler (hereinafter simply Scheduler). Cell-block is used to perform the actual cellification of packet data into ATM cells, one ATM cell at a time, and management of the packet control data associated with the ATM cell's packet as well as management of the buffer control data associated with the ATM cell's channel (more specifically, the channel's local buffer). The construction of the current ATM cell is overlapped with the management of the packet and buffer control data associated with the immediately preceding ATM cell. Scheduler is used to control the operation of Cell-block. Scheduler is also used to schedule DMA cycles to obtain additional packet data for the channels.

In the presently preferred embodiment, Cell-block includes a number of packet control data registers and calculation circuitry for storing and calculating various packet control data associated with the ATM cell currently being built. Cell-block further includes logic for maintaining the buffer control data associated with the ATM cell currently being built. More importantly, Cell-block further includes a number of writeback registers for staging updated packet and buffer control data associated with the immediately preceding ATM cell that require write back to the control memory. Lastly, Cell-block includes a number of state machines for controlling the operation of the above described elements in cooperation with the Scheduler. In particular, the state machines provide a number of feedback signals to Scheduler, including a first signal denoting Cell-block is substantially complete with the construction of the current ATM cell, meaning that the buffer control data in Cell-block may be altered for another ATM cell, and a second signal denoting Cell-block has just finished outputting the last word of the ATM cell, meaning that the packet control data in Cell-block may also be altered for another ATM cell.

In the presently preferred embodiment, Scheduler is a state machine that after initialization, runs continuously, transitioning between a number of states, including in particular a first state where Scheduler waits for Cell-block's notification that it is substantially complete with the current ATM cell. Additionally, the state machine includes a second state of conditionally retrieving the buffer control data associated with the new ATM cell to be constructed, and a third state of writing back the updated packet and control data associated with the immediately preceding ATM cell. Furthermore, the state machine includes a fourth state of retrieving the packet control data associated with the new ATM cell to be constructed, and a fifth state of scheduling DMA cycles for the channel of the immediately preceding ATM cell.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Figure 1:
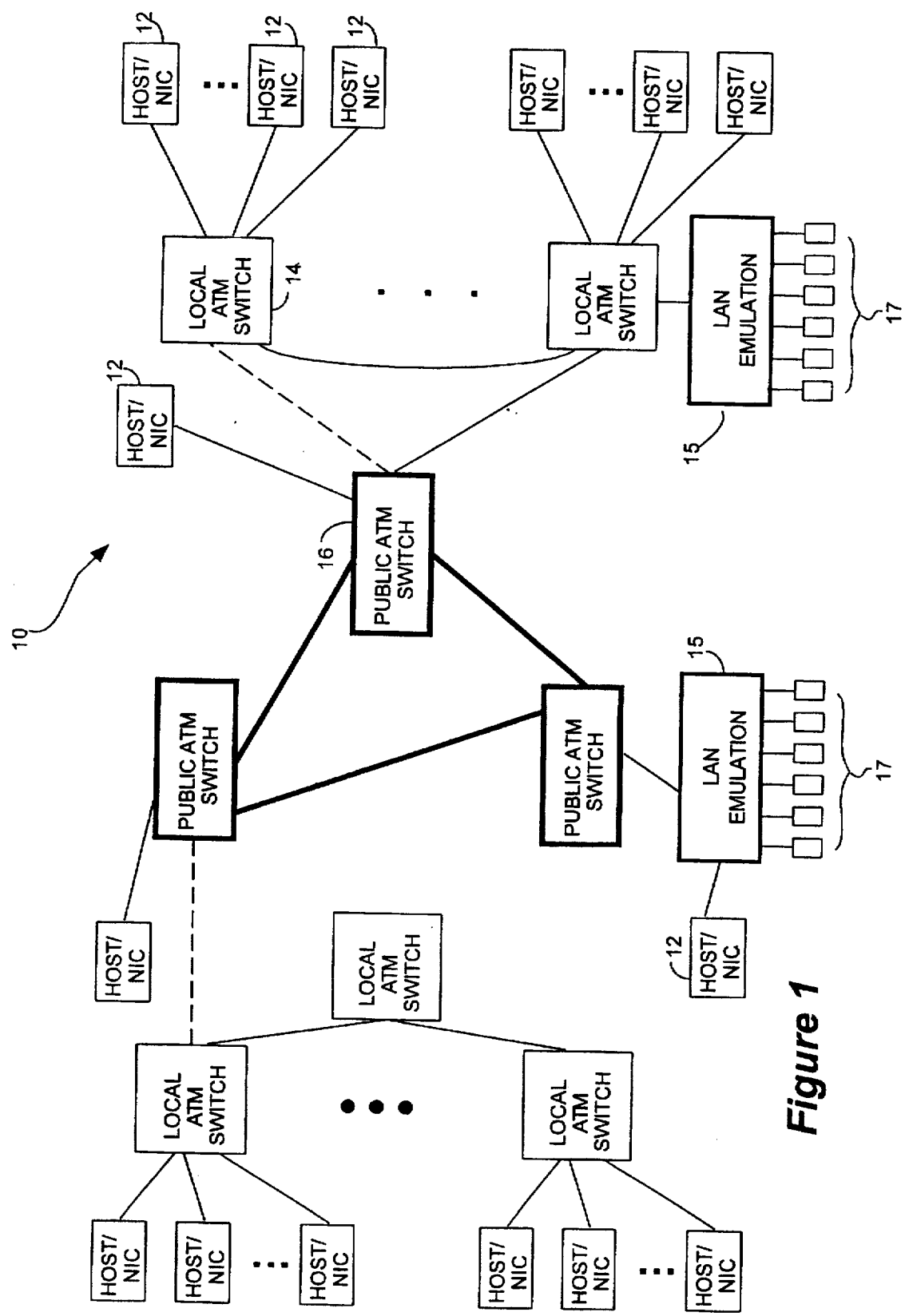
FIG. 1 illustrates an exemplary network of computer systems incorporating the teachings of the present invention.

FIG. 1 illustrates an exemplary computer system network incorporating the ATM NIC of the present invention. Computer system network 10 includes host computer systems (not shown) which incorporate one or more ATM NIC 12. NICs 12 are coupled through local ATM switches 14 to public ATM switches 16 to enable asynchronous transfer of data between host computer systems coupled to network 10. Alternatively, NICs 12 can be coupled directly to public ATM switches 16. As shown in FIG. 1, computer system network 10 may also include computer systems which incorporate the use of a Local Area Network (LAN) emulation 15, which serves as a gateway for connecting other networks such as Ethernet or token ring networks 17 which utilize the ATM network as a supporting framework.

Figure 2:
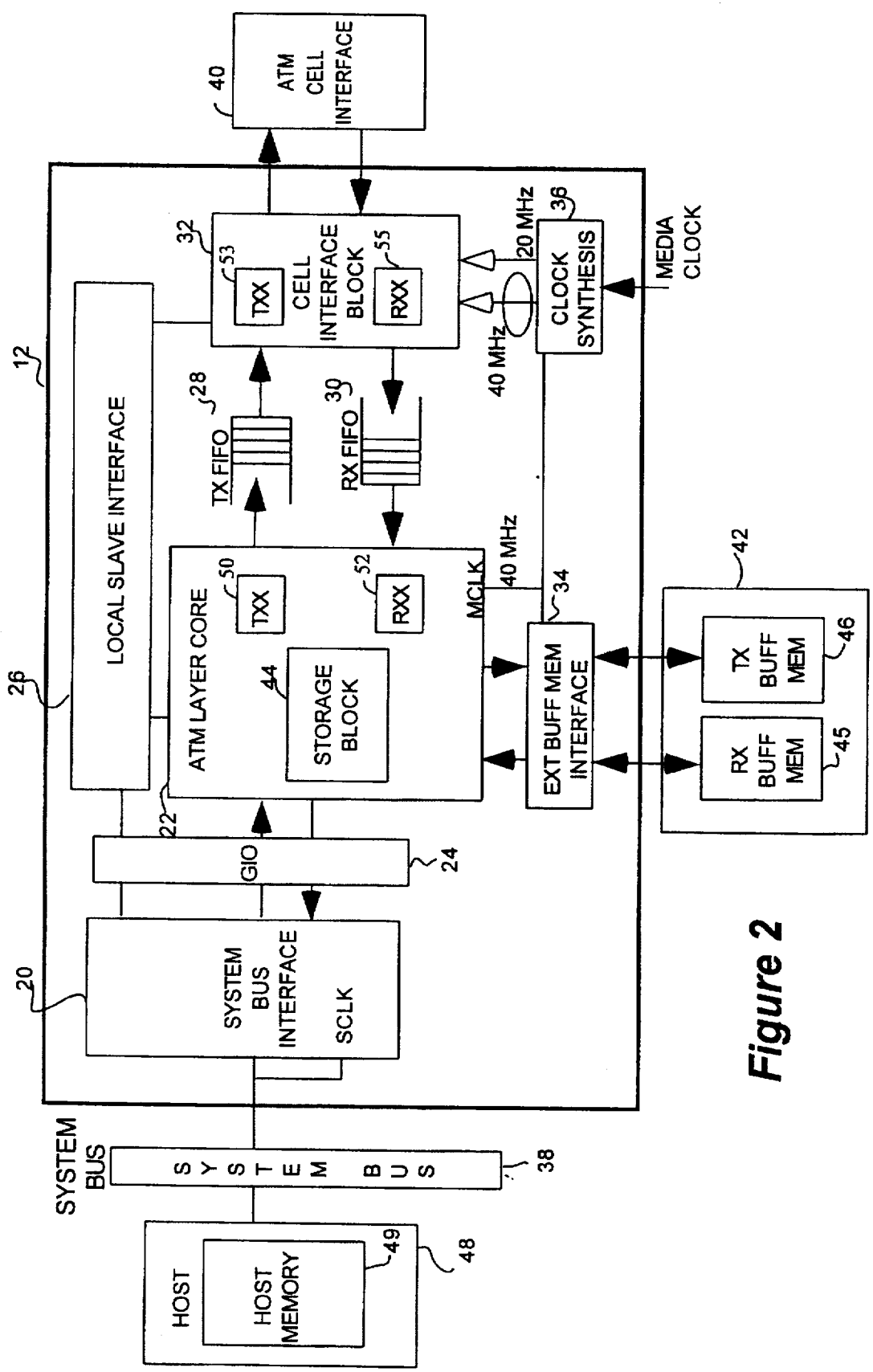
FIG. 2 illustrates one embodiment of the NIC of FIG. 1.

FIG. 2 is a simplified system diagram illustrating the architecture of ATM NIC 12 in accordance with a preferred embodiment of the present invention. ATM NIC 12 interfaces host computer system 48 coupled through system bus 38 to network ATM cell interface 40 operating in accordance with the ATM protocol.

ATM NIC 12 shown includes System Bus interface 20, Generic Input/Output (GIO) interface 24, System and ATM Layer Core 22, Local Slave interface 26, transmit (TX) FIFO 28, receive (RX) FIFO 30, Cell Interface Block 32, External Buffer Memory interface 34 and clock synthesis circuit 36.

Together, elements 20–36 of NIC 12 cooperate to transfer data between host computer 48 and the other computers in the network through multiple, dynamically allocated channels in multiple bandwidth groups. Collectively, the elements of NIC 12 function as a multi-channel intelligent direct memory access (DMA) controller coupled to System Bus 38 of host computer system 48. In a preferred embodiment, multiple transmit and receive channels function as virtual connections utilizing a full duplex 155/622 Mbps physical link. Multiple packets of data, subscribed to different channels over System Bus 38 to external buffer memory 42, via External Buffer Memory interface 34, are segmented by System and ATM Layer Core 22 into transmit cells for transmission to ATM cell interface 40 through Cell Interface Block 32. Core 22 includes reassembly logic to facilitate reassembly of the received cells to packets.

Three memory sub-systems are associated with the operation of the NIC 12. These include host memory 49 located in host computer system 48, external buffer memory 42 external to NIC 12 and storage block 44 located in the Core 22. NIC 12 manages two memory areas: external buffer memory 42 and storage block 44. External buffer memory 42 contains packet data for all transmit and receive channels supported by NIC 12. Storage block 44 contains DMA state information for transmit and receive channels and pointers to data structures in host memory 49 for which DMA transfers are performed. Storage block 44 also contains the data structure specifics to manage multiple transmit and receive buffers for packets in transition between host 48 and ATM Cell Interface 40.

Host computer system 48 includes host memory 49 which contains data packets and pointers to the packets being transmitted and received. As noted previously, NIC 12 also shields the cell delineation details of asynchronous transfer from the applications on host computer system 48. For present purposes, it is assumed that software running on host computer system 48 transmits and receive data using wrap around transmit and receive rings with packet interfaces as is well known in the art.

TX and RX FIFOS 28, 30, coupled between Core 22, and Cell Interface Block 32, are used to stage the transmit and receive cell payloads of the transmit and receive packets respectively. The Cell Interface Block 32 transmits and receives cells to the ATM Cell Interface 40 of the network, driven by clock signals provided by Clock Synthesis Circuit 36. Preferably, ATM Cell Interface 40, and therefore ATM Cell Interface 32, conforms to the Universal Test and Operations Physical Interface for ATM (UTOPIA) standard, as described by the ATM Forum Ad Hoc specification. To conform to the UTOPIA specification, the clock synthesis circuit 36 provides either a clock signal of 20–25 MHz or 40–50 MHz to enable Cell Interface Block 32 to support an 8-bit stream of 20–25 MHz for 155 Mbps or a 16-bit stream at 40–50 MHz for a 622 Mbps data stream.

In the presently preferred embodiment, Cell Interface Block 32 receives 52 byte data cells each having a 4 byte cell header and a 48 byte payload from TX buffer memory 46 through TX FIFO 28 under the control of Core 22, in groups of 4 bytes. Cell Interface Block 32 inserts a checksum as a fifth byte to the cell header into each cell prior to providing the 53 byte data cell to ATM Cell Interface 40 at either 155 or 622 Mbps. Conversely, when Cell Interface Block 32 receives cells from ATM Cell Interface 40, it examines the checksum in the fifth byte of each cell to determine if the checksum is correct. If so, the byte representing the checksum is stripped from the cell and the cell is forwarded to RX FIFO 30 4 byte sat a time at either 155 or 622 Mbps. Otherwise, the entire cell is dropped. Transferred bytes are stored in RX buffer memory 45 via external Buffer Memory Interface 34 under the control of Core 22.

In one embodiment, TX and RX FIFOS 28 and 30 are 33 bits wide, of which 32 bits are used for transmitting data and 1 bit is used as a tag. The tag bit is used to differentiate the 4-byte cell header from the 48-byte cell payload. The tag bit is generated by block TXX 50 located within Core 22. In one embodiment, the tag bit is set to 1 to indicate the start of a cell header and the tag bit is reset to 0 to indicate a cell payload. Thus, the tag bit is 1 for the first 4 bytes of the cell (header) and then the tag bit is 0 for the remaining 48 bytes of the cell (cell payload).

Upon receiving the data cells from TX FIFO 28, block TXX 53 located within Cell Interface block 32 examines the tag bit. If the tag bit is a 1, TX circuit 53 decodes the corresponding 32 bits as the header of the cell. If the tag bit is 0, TX circuit 53 decodes the corresponding 32 bits as data. Conversely, when Cell Interface block 32 receives data cells from ATM Cell Interface 40, block RXX 55 in Cell Interface block 32 generates a tag bit to differentiate the 4-byte cell header from the 48-byte cell payload. Cell Interface block 32 then dispatches the data cells in groups of 4 bytes to RX FIFO 30. Upon receipt of the cell data from RX FIFO 30, block RXX 52 in the Core 22 decodes the cell data in accordance with the value of the tag bit as discussed above.

Two synchronous clock signals, a 20 MHz signal and a 40 MHz signal, are provided to Cell Interface block 32 from the ATM Cell Interface Clock via the Clock Synthesis circuit 36. A 40 MHz clock is supplied to provide a 16-bit data stream at 40 MHz for 622 Mbps in accordance with the specifications of UTOPIA. A divide by 2 of the 40 MHz clock signal is performed in the Clock Synthesis circuit 36 to provide an 8-bit data stream at 20 MHz for 155 Mbps in accordance with the specifications of UTOPIA. The 40 MHz clock signal is also provided to the external buffer memory interface 34 for providing a 1.2 Gbps transmission rate. In addition, GIO 24 uses the 40 MHz clock signal for transmitting and receiving data.

TX Buffer Memory 46 provides 32 bits of data to the TX FIFO 28 and RX Buffer Memory 45 reads 32 bits of data from RX FIFO 30 at every cycle of the 40 MHz clock signal. However, ATM Cell Interface 40 reads 4 bytes of data from TX FIFO 28 every two clock cycles when operating at 622 Mbps, and reads 4 bytes of data from TX FIFO 28 every 8 clock cycles when operating at 155 Mbps. In the same manner, Cell Interface block 32 provides 4 bytes of data to TX FIFO 28 every two clock cycles when operating at 622 Mbps, and provides 4 bytes of data to TX FIFO 28 every 8 clock cycles when operating at 155 Mbps. Although the cell burst rate of Core 22 is different from the cell burst rate of Cell Interface block 32, the data rate between TX FIFO 28 and Cell Interface block 32 is, on average, the same as the data rate between the between TX FIFO 28 and Core 22. Similarly, the data rate between RX FIFO 30 and Cell Interface block 32 is on average, the same as the date rate between the RX FIFO 28 and Core 22. This is because the data rate between TX and RX FIFOS 28 and 30 and Core 22 is dependent the rate that data is read or written by Cell Interface block 32 respectively. In one embodiment, the depth of TX FIFO 28 is 18 words or 1½ cells long and the depth of RX FIFO 30 is 70 words long.

System Bus Interface 20 and GIO interface 24 insulate host computer system 48 from the specifics of the transfer to ATM Cell Interface 40. Furthermore, Core 22 is insulated from the specifics of system bus 38 and host specifics. In the presently preferred embodiment, the system bus is an S-Bus, as specified in the Institute of Electronics and Electrical Engineers (IEEE) standard 1496 specification. System Bus interface 20 is configured to communicate in accordance with the specifications of the system bus, in the present illustration, the S-Bus. It is contemplated that System Bus Interface 20 can be configured to conform to different host computer system busses. System Bus interface 20 is also configured to transfer and receive data in accordance with the protocols specified by GIO interface 24. GIO interface 24 provides a singular interface through which Core 22 communicates with the host computer. Thus, Core 22 does not change for different embodiments of NIC 12 which interface to different host computer systems and busses.

Figure 3:
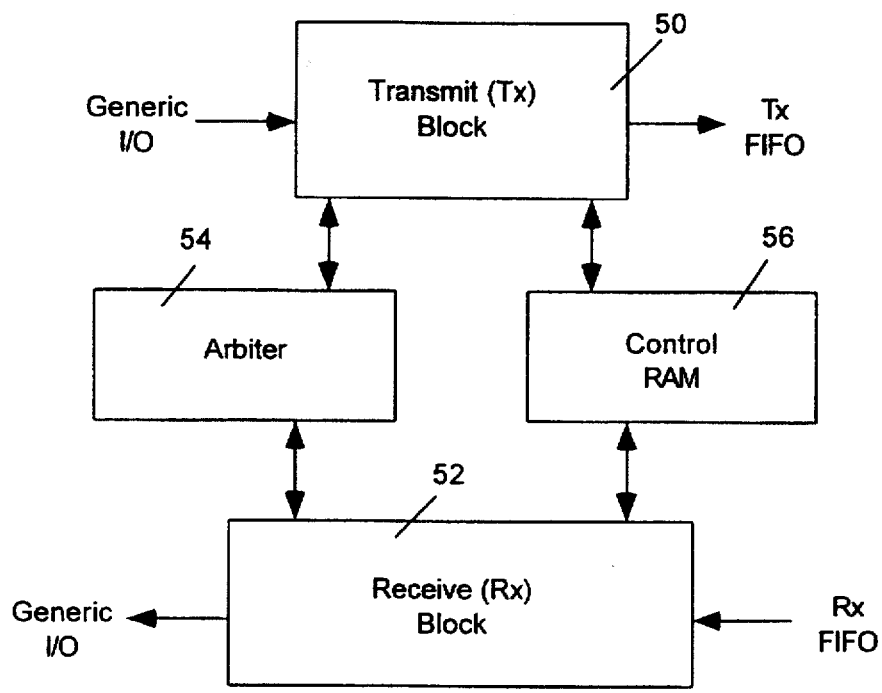
FIG. 3 illustrates the system and ATM layer core of FIG. 2.

FIG. 3 illustrates Core 22 in further detail. As shown, Core 22 comprises TX block 50, RX block 52, arbiter 54 and control memory 56 coupled to each other as illustrated. TX block 50 is used to asynchronously receive ATM packet data of the various channels from the host computer system, segment them into ATM cells, and provide the segmented ATM cells to TX FIFO 28. More specifically, packet data of various channels are asynchronously retrieved from host computer system and loaded into external memory 42, and then asynchronously segmented into ATM cells. In the presently preferred embodiment, packet data are stored in multiple FIFO buffers (not shown), one FIFO buffer per channel. More importantly, TX block 50 incorporates the teachings of the present invention, allowing TX block 50 to asynchronously segment the packet data of multiple channels into ATM cells at 622 Mbps or higher, to be described in more detail below.

RX block 52 is used to asynchronously receive ATM cells from RX FIFO 30, reassemble them into ATM packets and provide the reassembled ATM packets to the host computer system. In the presently preferred embodiment, RX block 52 incorporates the teachings disclosed in copending U.S. patent application, Ser. No. 08/473,514 for reordering the interleaved ATM cells for the different channels.

Control RAM 56 is used to store various control information for TX and RX blocks 50 and 52 including in particular, packet control data such as header, ATM Adaptation Layer (AAL5) control and length and AAL5 cyclic redundancy check (CRC), as well as buffer control data, i.e. read and write pointers of the channels' FIFO buffers. Lastly, arbiter 54 is used to arbitrate accesses to control RAM 56 between TX and RX blocks 50 and 52. Control RAM 56 and arbiter 54 may be implemented in a number of manners well known in the art.

Figure 4:
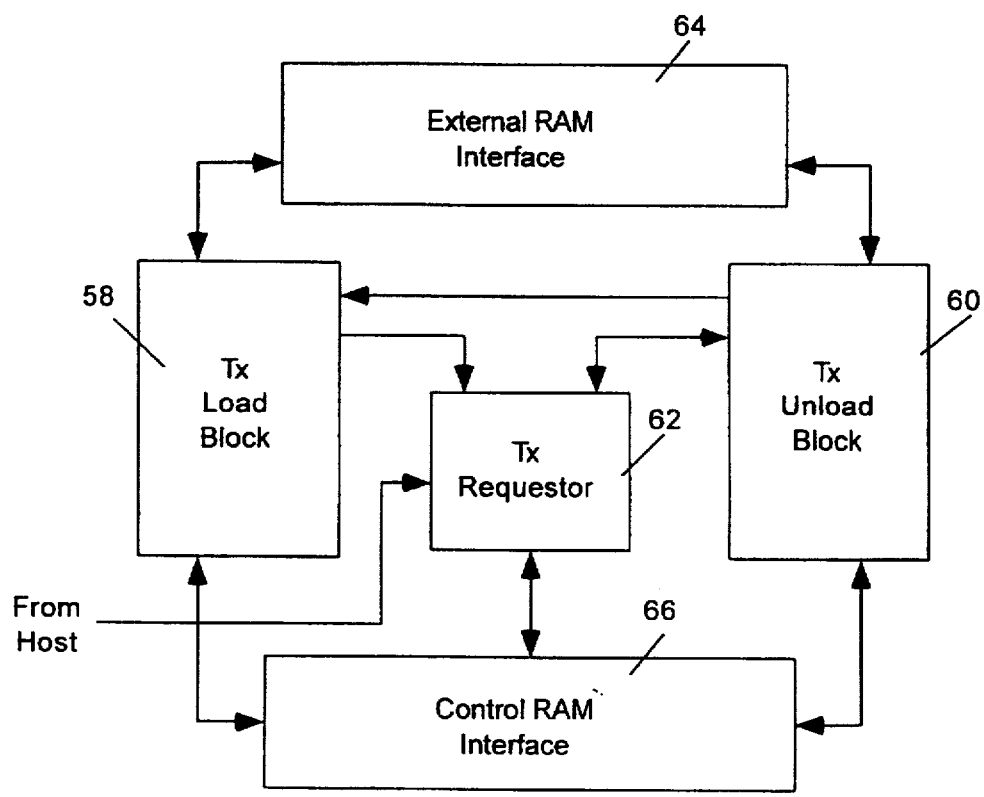
FIG. 4 illustrates the Transmit Block of FIG. 3.

FIG. 4 illustrates one embodiment of TX block 50 in further detail. As shown, for the illustrated embodiment, TX block 50 comprises TX Load block 58, TX Unload block 60, TX requestor 62, external RAM interface 64, and control RAM interface 66, coupled to each other as illustrated. TX Load block 58 is used to access the host computer system to retrieve additional packet data of a channel and store the retrieved packet data into the channel's FIFO buffer in external memory 42 for segmentation, in response to a DMA cycle scheduled by TX Unload block 60, to be described in more detail below. In the presently preferred embodiment, unless there are insufficient packet data on the host computer system, TX Load 58 retrieves a predetermined quantity of packet data for the channel. Upon finish loading the predetermined quantity, TX Load 58 notifies TX requestor 62.

TX Unload block 60 is used to cellifying packet data of the channels into ATM cells, one ATM cell at a time, in accordance to the teachings of the present invention, and provide the ATM cells to TX FIFO 28. TX Unload block 60 is also used to maintain the packet and buffer control data, as well as scheduling DMA cycles for the channels, in particular, when a channel is first serviced, and when packet data buffered in a channel's FIFO buffer fall below a predetermined threshold during segmentation. TX Unload block 60 will be described in further detail below.

TX requestor 62 is used generate channel requests for TX Unload 60. In the presently preferred embodiment, TX requestor 62 includes an internal prioritization scheme for prioritizing the channels for whom TX requestor 62 should generate requests to TX Unload 60. More specifically, a plurality of CBR channels are given pre-determined relative priorities, and a plurality of VBR channels are mapped into one of the CBR channels on a round robin basis. TX requestor 62 is initially informed of a channel's need for service by the host system. Subsequently, TX requestor 62 detects the channel's continuing need for service based on notifications from TX Load 58 that it has completed a DMA cycle for the channel or the channel's control data denoting non-zero quantity of packet data in the channel's FIFO buffer. TX requestor 62 will include a channel in its internal prioritization or arbitration, as long as either one of the two conditions is detected. TX requestor 62 may be implemented in a variety of manners, which are within the ability of those skilled in the art. The specific implementation is not directly relevant to the understanding and practice of the present invention, therefore TX requestor 62 will not be further described.

External and Control RAM interfaces 64 and 66 perform their conventional interfacing functions to the respective memories. External and Control RAM interfaces 64 and 66 may also be implemented in any number of approaches well known in the art.

Figure 5:
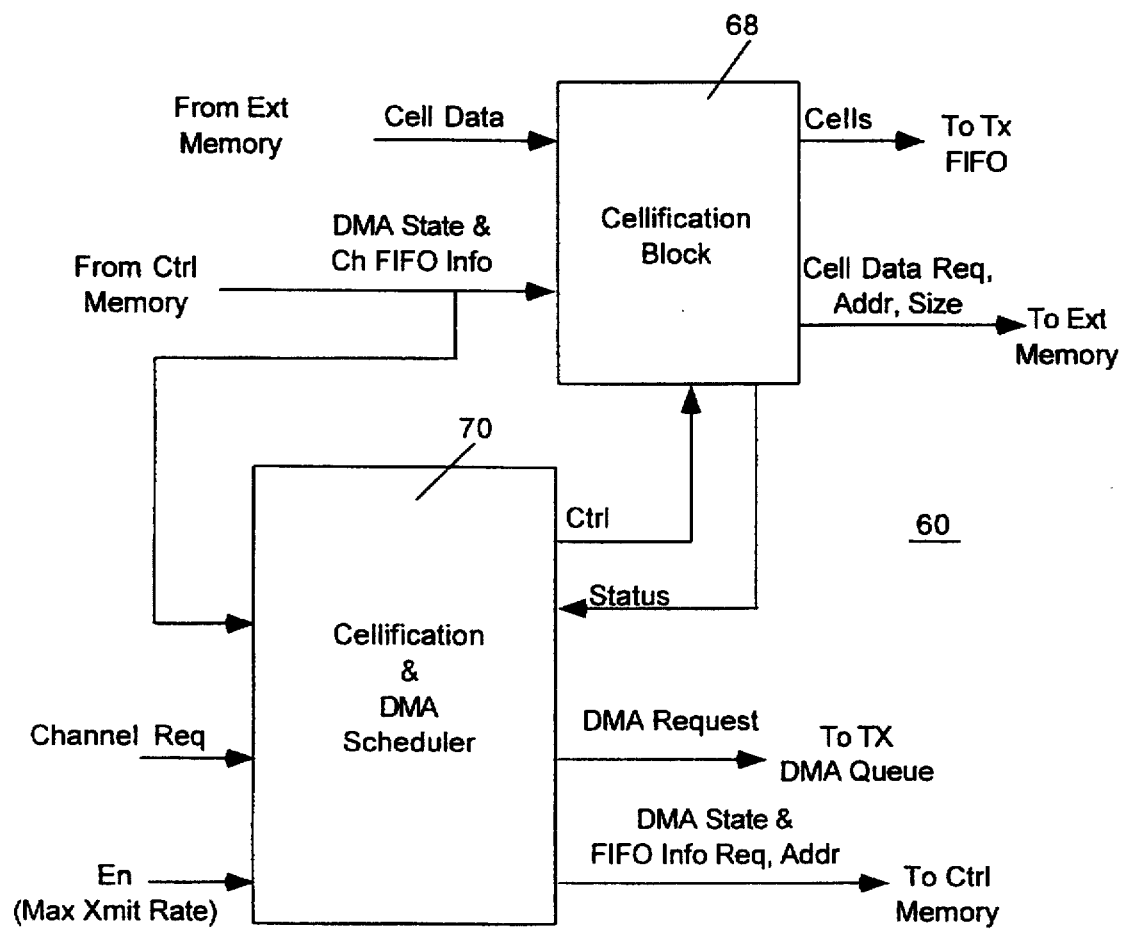
FIG. 5 illustrates the TX Unload block of FIG. 4.

FIG. 5 illustrates TX Unload block 60 in further detail. As shown, TX Unload block 60 comprises Cell-block 68, and Scheduler 70, coupled to each other. Cell-block 68 is used to perform the actual cellification of packet data of a channel into an ATM cell. Scheduler 70 causes packet control data associated with the packet and buffer control data associated with the channel to be retrieved from control memory 56 and provided to itself and Cell-block 68. In response, Cell-block 68 retrieves the channel's cell data from the channel's FIFO buffer in external memory 42, packages the cell data into an ATM cell, and provides the ATM cell to TX FIFO 28. Cell-block 68 updates the packet as well as the buffer control data, and writes the updated packet and buffer control data back to control memory 56. Cell-block 68 performs the above described functions responsive to the control of Scheduler 70. Cell-block 68 also provides feedback to Scheduler 70, more specifically, the fact that it has substantially completed construction the current ATM cell, meaning that its buffer control data may be altered for a new ATM cell, and the fact that the last word of the ATM cell has been output to TX FIFO 28, meaning that its packet control data may also be altered for a new ATM cell.

Scheduler 70 is used to control the cellification of packet data of a channel into an ATM cell, write back of the updated packet and buffer control data of the immediately preceding ATM cell, and scheduling of a DMA cycle for the channel to retrieve and store additional packet data into the channel's FIFO buffer in external memory 42. In the presently preferred embodiment, Scheduler 70 is informed of which channel is to receive service, and whether it's load or segmentation service, by TX requestor 62. In response to a request for load service, typically at the initial request for service by the host computer system, Scheduler 70 schedules a DMA cycle with TX Load 58 for the channel accordingly. In response to a request for segmentation service, Scheduler 70 first retrieves the channel's buffer control data for itself and for Cell-block 68. If the channel's FIFO buffer is nonempty, Scheduler 70 instructs Cell-block 68 to proceed with segmentation. In the course of segmentation, Scheduler 70 monitors to determine if the channel's packet data buffered in the channel's FIFO buffer fall below a predetermined threshold. If so, Scheduler 70 schedules a DMA cycle for the channel with TX Load 58.

In the presently preferred embodiment, Scheduler 70 also receives an "enable" signal from a maximum transmit data rate control circuit (not shown). The "enable" signal is asserted when it is okay for Scheduler 70 to instruct Cell-block 68 to proceed with segmentation, provided the above described conditions are met. The "enable" signal is deasserted as soon as Scheduler 70 so instruct Cell-block 68. Scheduler 70 will not instruct Cell-block 68 to proceed with segmentation again, notwithstanding the above described conditions for segmentation are met, until the "enable" signal is asserted again. The "enable" signal is asserted at the expiration of a counter. The counter is provided to the maximum transmit data rate control circuit by the host system. The counter in conjunction with the clock rate determines the maximum transmit bit rate. In the presently preferred embodiment, the counter is 26, and the clock rate is 40 MHz, yielding a maximum data rate of 640 Mbits per second.

Figure 6:
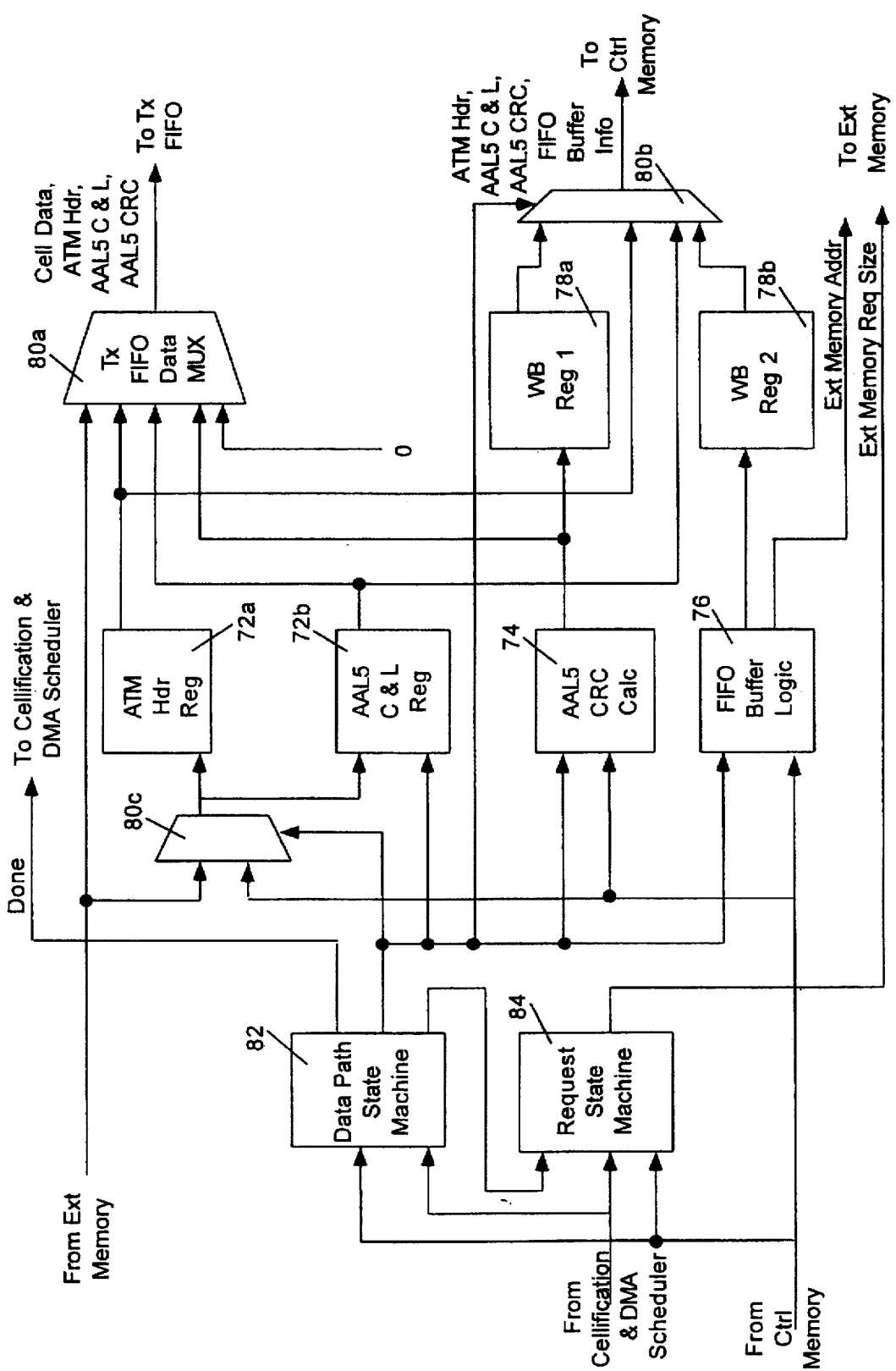
FIG. 6 illustrates Cell-block of FIG. 5.

FIG. 6 illustrates Cell-block 68 in further detail. As shown, Cell-block 68 includes control data registers 74a–74b, CRC calculation circuitry 74, FIFO buffer logic 76, writeback registers 78a–78b, multiplexers 80a–80c, datapath state machine 82, and request state machine 84, coupled to each other as illustrated. Control data registers 72a–72b are used to store the ATM header and AAL5 control and length. Initially, they are loaded from external memory 42. Subsequently, they are loaded from control memory 56. Multiplexer 80c is used to select the source, i.e. external or control memory for ATM header and AAL5 control and length. CRC calculation circuitry 74 is used to generate CRC values. Multiplexer 80a is used to select the "data" that gets output to TX FIFO 28, i.e. cell data (including the idle cell "0"), ATM header, AAL5 control and length or AAL5 CRC.

FIFO buffer logic 76 is used to generate the external memory addresses for the cell data to be cellify. FIFO buffer logic 76 also updates the FIFO buffer status information, i.e. the read and write pointers for the channel's FIFO buffer. Multiplexer 80b selects what gets output back to control memory 56, i.e. ATM header, AAL5 CRC, AAL5 control and length or FIFO buffer status information. Writeback registers 78a–78b are used to stage the updated AAL5 CRC and FIFO buffer status information to be written back to control memory 56. Writeback registers 78a–78b free up CRC calculation circuitry 74 and FIFO buffer logic 76 to service a new channel while the previous channel's AAL5 CRC and FIFO buffer status information are still being written back to control memory 56.

These elements 72a, 72b, 74–76, 78a–78b and 80a–80c are all operated under the control of datapath state machine 82 and request state machine 84 as shown. Both state machine 82 and 84 control these elements responsive to the control data cause to be retrieved from control memory 56 by Scheduler 70, as well as control signals provided by Scheduler 70, in particular, a segmentation signal, instructing state machines 82 and 84 to start cellification. Lastly, datapath state machine 82 provides status feedback to Scheduler 70, in particular, a cellification done signal and a last word written signal. The cellification done signal denotes Cell-block 68 is substantially done with the current cellification, meaning the buffer control data in Cell-block 68 may be altered for another ATM cell, whereas, the last word written signal denotes the last word of the current ATM cell has been written into TX FIFO 28, meaning the packet control data in Cell-block 68 may be altered for another ATM cell.

Figure 7:
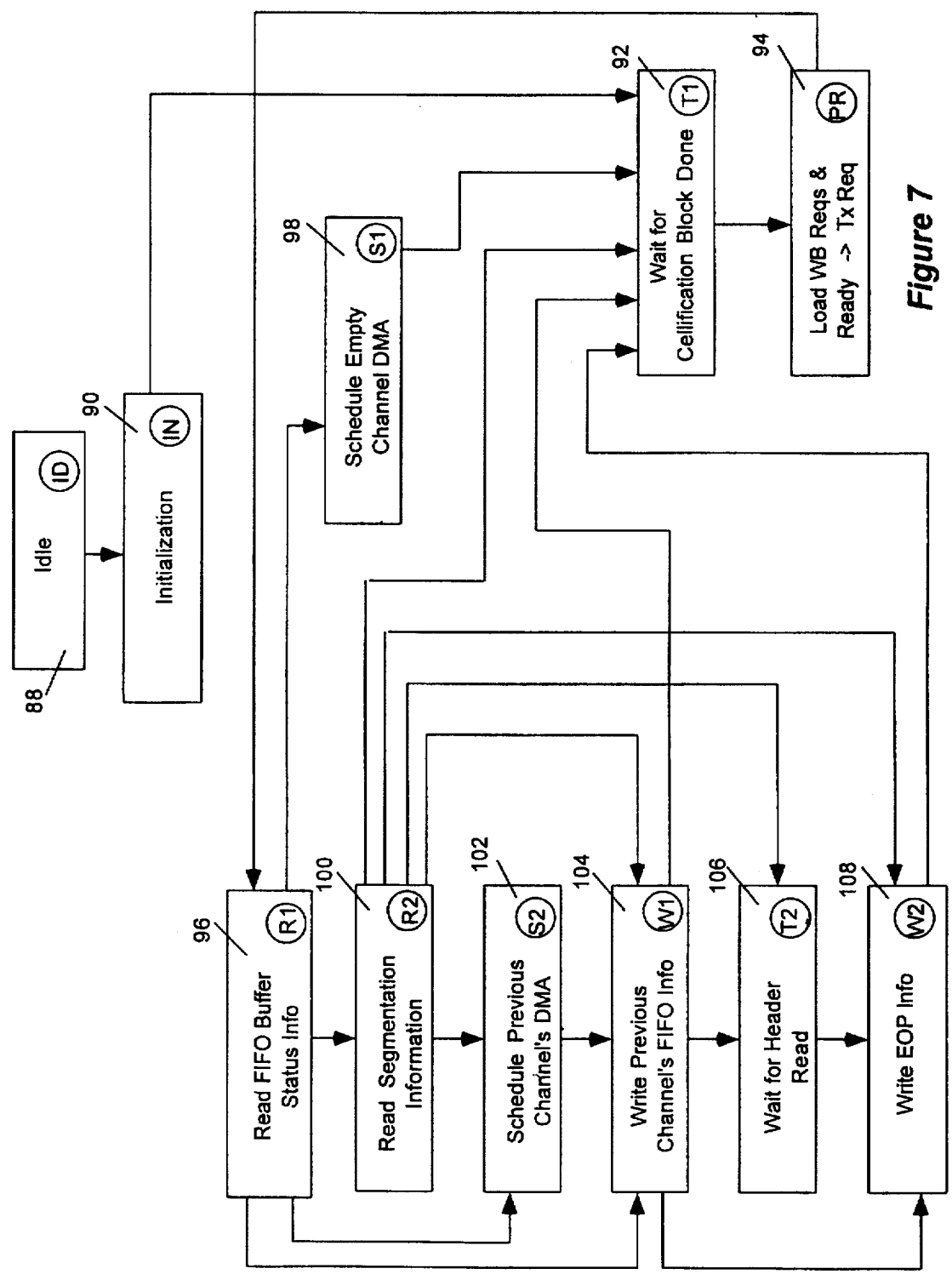
FIG. 7 illustrates the states of Scheduler of FIG. 5.

FIG. 7 illustrates the general operational states of Scheduler 70. The general operational states illustrated are not actual states employed in implementation. They are composites of the actual states, created to facilitate better appreciation of the present invention. Some insignificant aspects including transitions between states have been omitted to avoid obscuring the present invention.

As shown, at power on/reset Scheduler 70 is in idle state 88, it then goes into initialization state 90. While in the initialization state, Scheduler 70 sets up its initial operating condition. Upon setting up its initialization condition, Scheduler 70 runs continuously. At any instance in time, Scheduler 70 is in one of the remaining general operational states 92–98.

From initialization, Scheduler 70 enters first wait state 92 where it waits for the feedback cellification done signal from Cell-block 68, denoting Cell-block 68 is ready to proceed with another ATM cell. Upon receipt of the cellification done signal, Scheduler 70 enters preparation state 94 where it provides control signals to Cell-block 68 instructing Cell-block 68 to load writeback registers 78a–78b. At the same time, Scheduler 70 provides control signals to TX requestor 62 notifying TX requestor 62 that it is ready to service the next channel.

Next, Scheduler 70 proceeds to first read state 96 where it conditionally reads the current channel's FIFO buffer status information. Scheduler 70 first determines if TX requestor 62 has selected a channel for cellification service or DMA service. If TX requestor 62 has selected a channel for DMA service, Scheduler 70 provides control signals to Cell-block 68 to send an idle cell. Upon sending an idle cell, depending on whether there was a previous channel serviced, and if there was a previous channel serviced, whether the previous channel serviced requires control data writeback scheduling, Scheduler 70 either proceeds to first schedule state 98 or second schedule state 102, or first write state 104. On the other hand, if TX requestor 62 has selected a channel for cellification service, Scheduler 70 retrieves the channel's FIFO status information for itself and Cell-block 68. If the current channel is not the same channel as the previous channel serviced, and Cell-block has finished writing the last word to TX FIFO 28, Scheduler 70 proceeds to second read state 100. If the current channel is the same channel as the previous channel serviced, then depending on whether the previous channel requires control data writeback scheduling, Scheduler 70 either proceeds to second schedule state 102, or first write state 104.

At first schedule state 98, Scheduler 70 retrieves the channel's FIFO buffer status information (note that the channel's FIFO buffer is empty) for itself and Cell-block 68, schedules a DMA cycle for the channel, and provides control signals to Cell-block 68 to write back the updated FIFO buffer status information. Upon doing so, Scheduler 70 proceeds to first wait state 92.

At second read state 100, Scheduler 70 retrieves the channel's ATM header, AAL5 control and length, and AAL5 CRC for itself and Cell-block 68. Next, if there was a previous channel serviced, Scheduler 70 proceeds to either second schedule state 102 or first write state 104, depending on whether scheduling is required for the previous channel serviced. On the other hand, if there was no previous channel serviced, then Scheduler 70 either proceeds to first wait state 92 if it is not the starting cell of a packet that is being serviced, or to either second wait state 106 or second write state 108, depending on whether Cell-block 68 has completed reading the header information from external memory 42 (which was initiated by Cell-block 68 at the start of a packet).

At second schedule state 102, Scheduler 70 schedule a DMA cycle with TX Load 58 for the previous channel, and proceeds to first write state 104. At first write state 104, Scheduler 70 provides control signals to Cell-block 68 to write back previous channel's updated FIFO buffer status information as well as updated AAL5 CRC. Next, if it is not the starting cell of a packet that is being serviced, Scheduler 70 proceeds to first wait state 92, otherwise Scheduler 70 proceeds to either second wait state 106 or second write state 108, depending on whether Cell-block 68 has completed reading the header information from external memory 42, as described earlier.

At second wait state 106, Scheduler 70 simply waits for Cell-block to complete reading the header from external memory 42, and then proceeds to second write state 108. At second write state 108, Scheduler 70 provides control signals to Cell-block 68 to write back current channel's ATM header and AAL5 control and length. Upon doing so, Scheduler 70 then proceeds to first wait state 92.

Thus, first wait state 92, preparation state 94, first read state 96, second read state 98, second schedule state 100, first write state 102, second wait state 106, and second write state 108 together form the critical path, i.e., the longest path to be accomplished within the time constraint.

Figure 8:
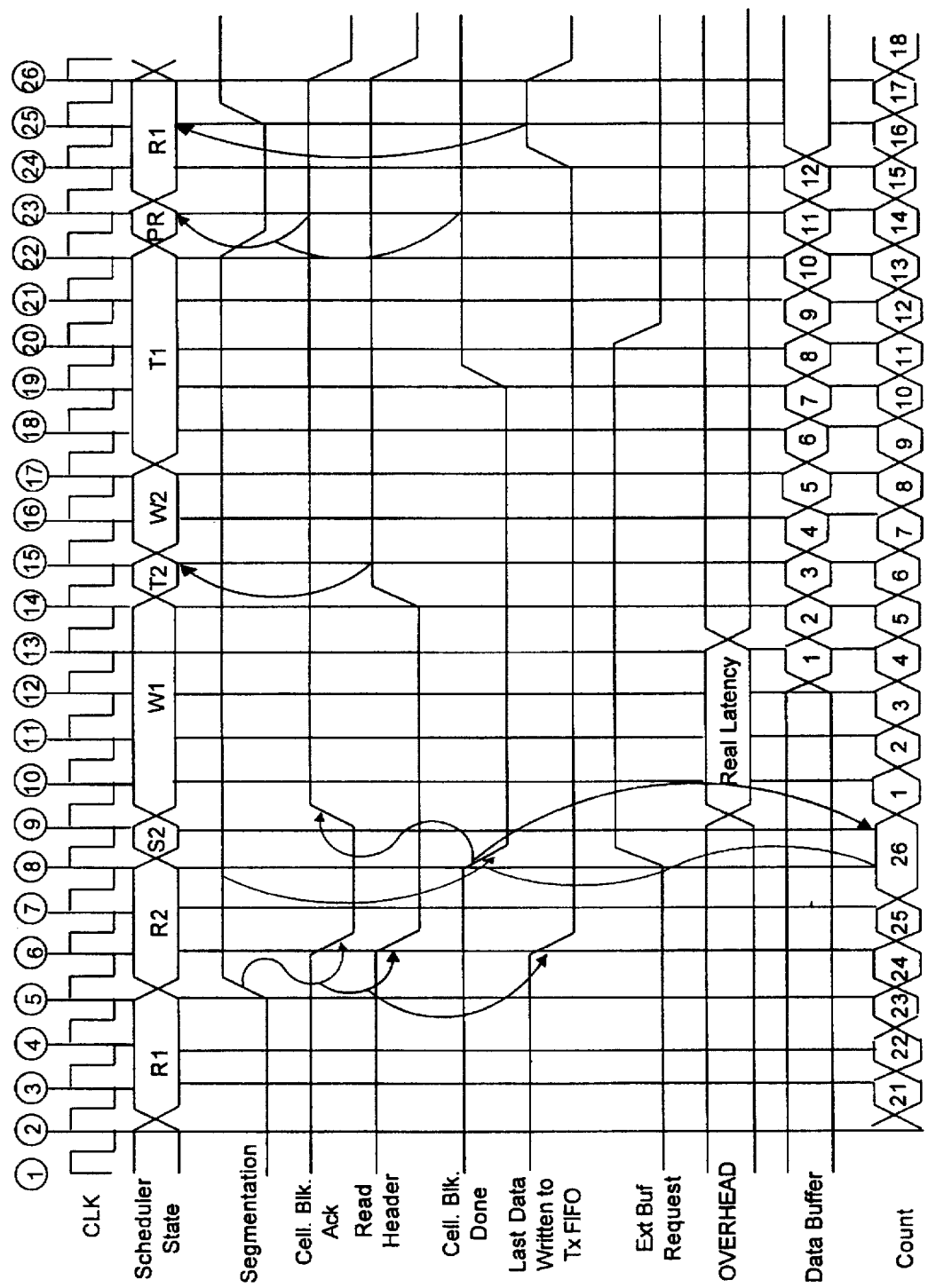
FIG. 8 is a timing diagram illustrating how Cell-block and Scheduler cooperate to achieve the desired results for an exemplary scenario.

FIG. 8 is a timing diagram illustrating an exemplary scenario under which the critical path is traversed in the required timing. As shown in FIG. 8, upon detection of the assertion of the cellification done signal (going high) by Cell-block 68, Scheduler 70 enters the first read state (R1). For this example, Scheduler 70 determines that TX requestor 62 has selected a channel for cellification service, and in response, causes the FIFO buffer status information to be retrieved for itself and Cell-block 68, consuming clock cycles two through four. Assuming further that the current channel requiring service is not the same channel as the previous channel, Scheduler 70 asserts the segmentation signal (going high) and proceeds into second read state (R2). While in the second read state, Scheduler 70 causes the packet control data to be retrieved for itself and Cell-block 68, consuming clock cycles five through seven. In the meantime, in response to the segmentation signal, Cell-block 68 deasserts the Cell-block done and last data written to TX FIFO signals, and proceeds to generate an external memory request for the current ATM cell's cell data. The generation of the external memory request and its associated addresses and size will take a couple of clock cycles to accomplish, resulting in the request being generated on or about the eighth clock cycle. Assuming the latency is about four clock cycles, the ATM cell data will become available approximately from clock cycle twelve through clock cycle twenty-four. The cell data are output to the TX FIFO 28 as they become available, forming the current ATM cell.

In the meantime, assuming further that the previous channel's packet data in the channel's FIFO buffer has fallen below the predetermined threshold and requires a DMA cycle to be scheduled, in parallel with the ATM cell being built, Scheduler 70 proceeds into the second schedule state (S2), and schedule a DMA cycle with TX Load 58, during clock cycle eight. Furthermore, if the packet and buffer control data of the previous channel require write back, Scheduler 70 enters first write back state (W1) and writes back the updated packet and buffer control data for the previous channel, consuming clocks nine through thirteen. Assuming further that the current ATM cell is the starting cell of a packet, and Cell-block 68 is reading the packet header, Scheduler 70 further enters into the second wait state (T2) to wait for the header read to be completed. When header read is completed, Scheduler 70 proceeds into second write state (W2). For illustrative purposes, we will assume Scheduler 70 runs out of things that it can do in parallel with the ATM cell being built, and proceeds into first wait state (T1) to wait for cellification completion.

As shown, for this example, the last word (word 12) is returned on or about clock cycle 23, which is deterministic (from the time the external request is issued). On or about clock 19, four clock cycles before the actual output of the last word for the current ATM cell, Cell-block 68 asserts cellification done again for Scheduler 70. In response, Scheduler 70 withdraws the segmentation signal, enters into preparation state (PR), and instructing Cell-block 68 to save a copy of the updated AAL5 CRC and FIFO buffer status information in writeback registers 78a–78b, consuming clock cycle 22.

Once the updated packet and buffer control data have been loaded into writeback registers 78a–78b, the overlapping process starts over again, as illustrated by Scheduler 70 entering first read state (R1) in clock cycle 23, and Cellblock 68 asserting last data written in TX FIFO in clock cycle 24. In other words, the overlapping of the cellification of the current ATM cell with the management of packet and buffer control data associated with the previous ATM cell allows an ATM cell to be constructed with the full discharge of all other substantive responsibilities within the time constraint.

Thus, a method and apparatus for segmenting packets into ATM cells has been described. While the method and apparatus of the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
   (a) a cellification block for constructing asynchronous transfer mode (ATM) cells for packets of multiple channels, including management of packet control data to be selectively incorporated into the ATM cells, and management of buffer control data for storage buffers used for streaming the packets, overlapping at least the construction of an ATM cell for a packet of a current channel with the management of the packet and buffer control data of an immediately preceding channel; and
   (b) a scheduler coupled to the cellification block for controlling the cellification block.

2. The apparatus as set forth in claim 1, wherein the cellification block comprises a plurality of packet control data registers for storing packet control data for the packet of the ATM cell currently being constructed, and a multiplexor for selectively loading the packet control data from either a first or a second memory.

3. The apparatus as set forth in claim 1, wherein the cellification block comprises calculation circuitry for calculating packet control data for the ATM cell currently being constructed, and at least one writeback register for storing at least one packet control data calculated for the immediately preceding ATM cell constructed.

4. The apparatus as set forth in claim 1, wherein the cellification block comprises logic circuitry for maintaining buffer control data for the channel of the ATM cell currently being constructed, and at least one writeback register for storing at least one updated buffer control data for the immediately preceding ATM cell constructed.

5. The apparatus as set forth in claim 1, wherein the cellification block comprises a state machine for providing a feedback signal to the scheduler, informing the scheduler that the cellification block has substantially completed constructing the current ATM cell, buffer control data currently in cellification block may now be altered.

6. The apparatus as set forth in claim 1, wherein the cellification block comprises a state machine for providing a feedback signal to the scheduler informing the scheduler the cellification block has output the last word for the ATM cell currently being constructed, packet control data currently in cellification block may now be altered.

7. The apparatus as set forth in claim 1, wherein the scheduler is a state machine that runs continuously after initialization, transitioning between a plurality of states, including a first state where the state machine waits for the cellification block's notification that the cellification block has substantially completed construction of the current ATM cell.

8. The apparatus as set forth in claim 7, wherein the state machine further comprises a second state of conditionally reading the buffer control data of the current ATM cell's channel, and a third state of writing the buffer control data of the immediately preceding ATM cell's channel.

9. The apparatus as set forth in claim 1, wherein the scheduler is also used for scheduling a direct memory access cycle for a channel when the channel is serviced for a first time or whenever the buffered packet data for the channel fall below a predetermined threshold.

10. The apparatus as set forth in claim 9, wherein the scheduler is a state machine that runs continuously after initialization, transitioning between a plurality of states, including a first state where the state machine waits for the cellification block's notification that the cellification block has completed construction of the current ATM cell, a second state of reading the packet control data of the current ATM cell's channel, and a third state of scheduling a direct memory access cycle for the immediately preceding ATM cell's channel.

11. In a computer system, a method for constructing asynchronous transfer mode (ATM) cells for packets of multiple channels, the method comprising the steps of:
   (a) notifying a scheduler by a cellification block that the cellification block has substantially completed constructing a first ATM cell for a first packet of a first channel, buffer control data in cellification block may now be altered for the construction of a second ATM cell for a second packet of a second channel;
   (b) instructing the cellification block by the scheduler to save a copy of any updated packet control data associated with the first packet, and any updated buffer control data associated with the first channel that require write back to a control memory;
   (c) causing packet control data associated with the second packet, and buffer control data associated with the second channel to be retrieved for the scheduler and for the cellification block by the scheduler;
   (d) instructing the cellification block to proceed with construction of the second ATM cell by the scheduler, and in response, retrieving cell data for the second ATM cell by the cellification block using the retrieved buffer control data for the second channel, and constructing the second ATM cell by the cellification block using the retrieved cell data and the retrieved packet control data of the second packet; and
   (e) concurrent with the construction of the second ATM cell, determining if there were any updated packet control data associated with the first packet, and any updated buffer control data associated with the first channel by the scheduler, instructing the cellification block to perform the required writeback by the scheduler, and performing the required writeback by the cellification block.

12. The method as set forth in claim 11, wherein, step (a) further comprises notifying the scheduler by the cellification block that the cellification has completed outputting the last word of the first ATM cell, packet control data in cellification block may now be altered for the cellification of the second ATM cell.

13. The method as set forth in claim 11, wherein the method further comprises the step of: (f) concurrent with the construction of the second ATM cell, determining if the first channel requires a direct memory access cycle to be scheduled to have additional packet data be loaded into buffers of the first channel, and if required, scheduling the direct memory access cycle for the channel.

14. A computer system comprising:

(a) a first memory including a plurality of FIFO buffers for storing a plurality of packet data for a plurality of packets of a plurality of channels, one FIFO buffer per channel;

(b) a second memory for storing a plurality of packet control data associated with the packets and a plurality of buffer control data associated with the FIFO buffers of the channels;

(c) a cellification block coupled to the first and second memory for constructing asynchronous transfer mode (ATM) cells for the packets of the channels, including management of the packet control data, and management of the buffer control data, overlapping at least the construction of an ATM cell for a packet of a current channel with the management of the packet and buffer control data of an immediately preceding channel; and (d) a scheduler coupled to the cellification block for controlling the cellification block.

15. The computer system as set forth in claim 14, wherein the cellification block comprises calculation circuitry for calculating packet control data for the ATM cell currently being constructed, and at least one writeback register for storing at least one packet control data calculated for the immediately preceding ATM cell constructed.

16. The computer system as set forth in claim 14, wherein the cellification block comprises logic circuitry for maintaining buffer control data for the channel of the ATM cell currently being constructed, and at least one writeback register for storing at least one updated buffer control data for the immediately preceding ATM cell constructed.

17. The computer system as set forth in claim 14, wherein the cellification block comprises a state machine for providing a feedback signal to the scheduler informing the scheduler that the cellification block has substantially completed constructing the current ATM cell, buffer control data in cellification block may now be altered for the construction of another ATM cell.

18. The computer system as set forth in claim 14, wherein the cellification block comprises a state machine for providing a feedback signal to the scheduler informing the scheduler the cellification block has output the last word for the ATM cell currently being constructed, packet control data in cellification block may now be altered for the construction of another ATM cell.

19. The apparatus as set forth in claim 14, wherein the scheduler is a state machine that runs continuously after initialization, transitioning between a plurality of states including a first state where the state machine waits for the cellification block's notification that the cellification block has completed construction of the current ATM cell, a second state of conditionally reading the buffer control data of the current ATM cell's channel, and a third state of writing the buffer control data of the immediately preceding ATM cell's channel.

20. The apparatus as set forth in claim 14, wherein, the scheduler is also used for scheduling a direct memory access cycle for a channel when the channel is serviced for a first time or whenever the buffered packet data for the channel fall below a predetermined threshold;

the scheduler is a state machine that runs continuously after initialization, transitioning between a plurality of states including a first state where the state machine waits for the cellification block's notification that the cellification block has completed construction of the current ATM cell, a second state of reading the packet control data of the current ATM cell's channel, and a third state of scheduling a direct memory access cycle for the immediately preceding ATM cell's channel.

* * * * *